United States Patent

Weinberger et al.

[11] Patent Number: 6,021,030
[45] Date of Patent: Feb. 1, 2000

[54] ISO ID-1 SIZE MEMORY CARD WITH SHUTTER ASSEMBLY

[75] Inventors: Zvi Weinberger, Jerusalem; Lev Hozatsky, Bnei Brak, both of Israel

[73] Assignee: MEM-Card Computer Memory Systems Ltd., Jerusalem, Israel

[21] Appl. No.: 09/098,922

[22] Filed: May 29, 1998

Related U.S. Application Data

[63] Continuation of application No. PCT/IL96/00170, Nov. 27, 1996.

[30] Foreign Application Priority Data

Dec. 3, 1995 [IL] Israel ............................ 116241

[51] Int. Cl.[7] .................................................. G11B 23/03
[52] U.S. Cl. ...................... 360/133; 360/99.02; 369/291
[58] Field of Search ................... 360/99.02, 133; 369/291

[56] References Cited

U.S. PATENT DOCUMENTS

| | | | |
|---|---|---|---|
| 4,849,844 | 7/1989 | Kato | 360/133 |
| 5,107,099 | 4/1992 | Smith | 235/449 |
| 5,153,801 | 10/1992 | Ikebe et al. | 360/133 |
| 5,262,917 | 11/1993 | Kikuchi et al. | 360/133 |
| 5,274,612 | 12/1993 | Sato et al. | 369/13 |
| 5,526,337 | 6/1996 | Housey et al. | 360/133 |
| 5,537,389 | 7/1996 | Kuwa et al. | 369/291 |
| 5,689,393 | 11/1997 | Watanabe | 360/133 |
| 5,764,623 | 6/1998 | Akiyama et al. | 369/291 |
| 5,768,074 | 6/1998 | Sumner et al. | 360/133 |
| 5,805,555 | 9/1998 | Jones et al. | 369/77.2 |

FOREIGN PATENT DOCUMENTS

| | | |
|---|---|---|
| 410112 | 4/1991 | European Pat. Off. . |
| 484 788 | 5/1992 | European Pat. Off. . |
| 60-079581 | 9/1985 | Japan . |
| 60-219687 | 4/1986 | Japan . |
| 61-016082 | 6/1986 | Japan . |
| 61-039990 | 7/1986 | Japan . |
| 62-054881 | 8/1987 | Japan . |
| 64-67781 | 3/1989 | Japan . |
| 3-122880 | 5/1991 | Japan . |
| 3-48780 | 10/1991 | Japan . |
| 4-16309 | 4/1992 | Japan . |
| 5-89298 | 4/1993 | Japan . |
| 90/13093 | 4/1990 | WIPO . |
| 94/11877 | 11/1993 | WIPO . |

*Primary Examiner*—Jefferson Evans
*Attorney, Agent, or Firm*—Darby & Darby

[57] ABSTRACT

A memory card includes a base sheet formed with a circular opening to accommodate a circular memory disc, and a lateral opening to accommodate a movable window assembly; a circular memory disc rotatably mounted within the circular opening; and a movable window assembly within the lateral opening of the base sheet and covered by cover sheets. The movable window assembly includes a plastic film carried by a carrier member and movable either to a protective position wherein the plastic film covers a window opening in the cover sheets, or to an exposing position laterally of the window opening wherein the plastic film exposes the Read section of the circular memory disc to the Read head of the reader.

5 Claims, 4 Drawing Sheets

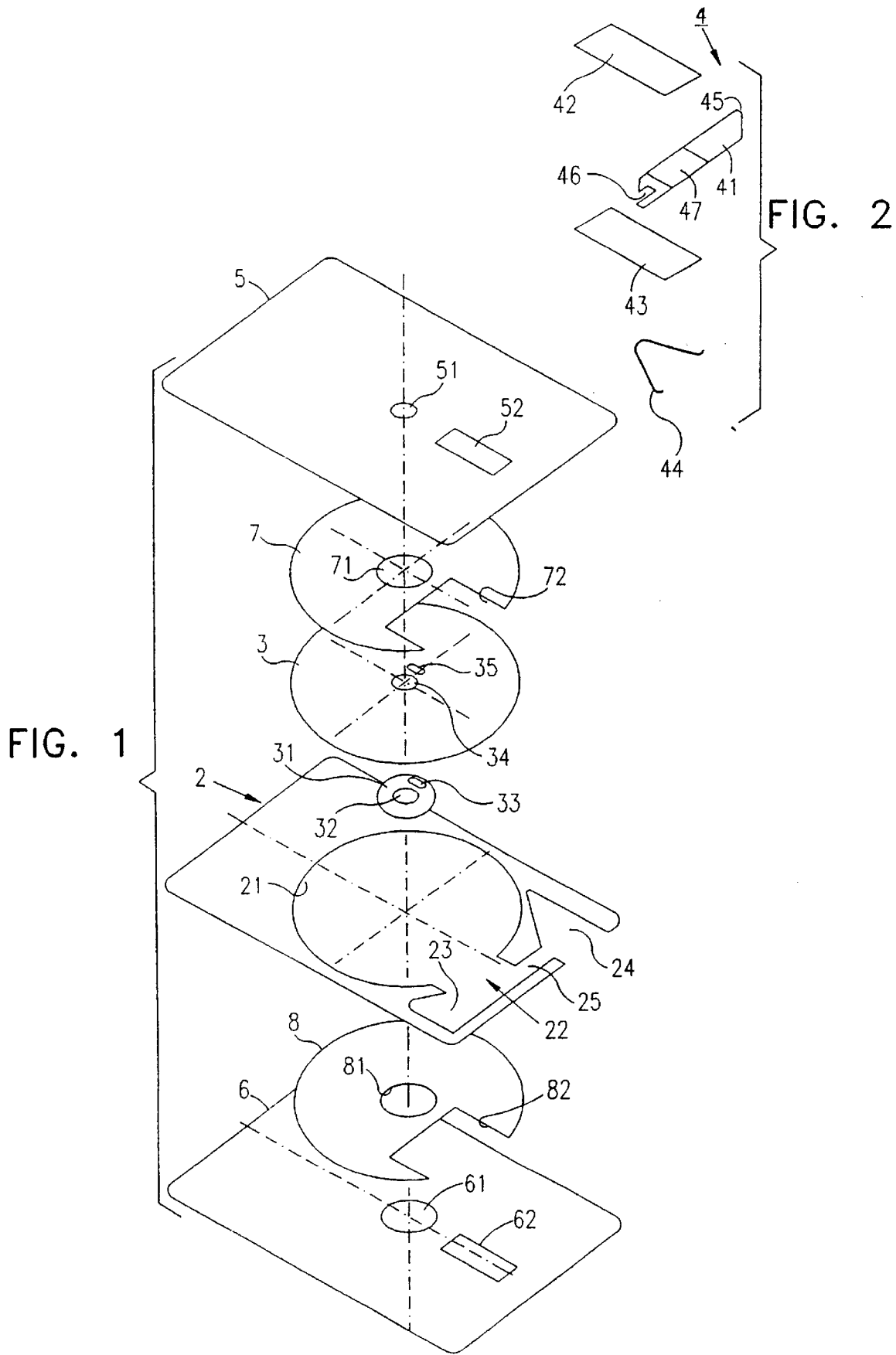

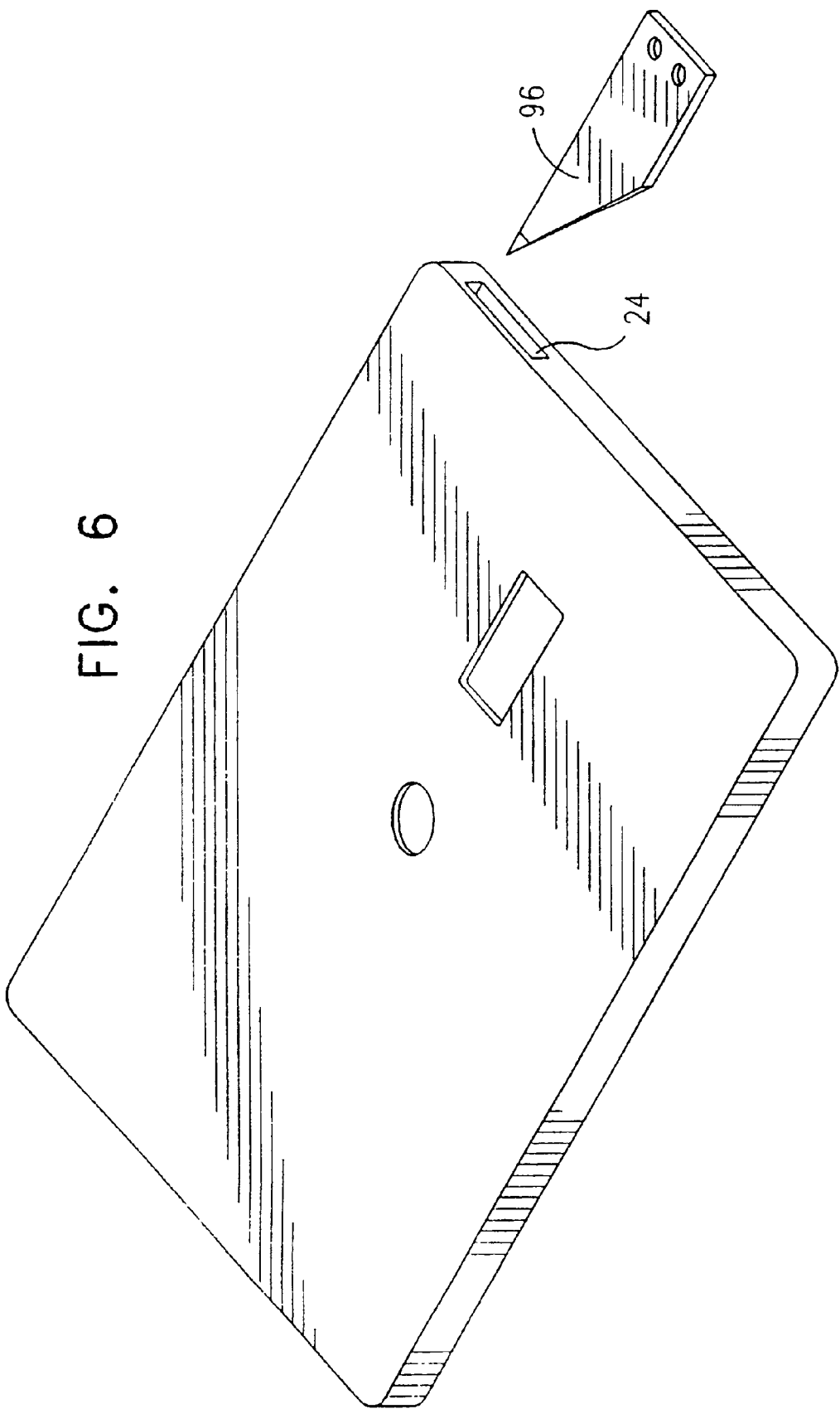

ISO ID-1 SIZE MEMORY CARD WITH SHUTTER ASSEMBLY

This is a continuation of international application Ser. No. PCT/IL96/00170, filed Nov. 27, 1996.

FIELD OF THE INVENTION

The present invention relates to a memory card having an extremely high memory capacity. The invention also relates to a reader for receiving the novel memory card, and for recording information and/or reading the information recorded thereon.

BACKGROUND OF THE INVENTION

Memory cards are now widely used for recording various types of information to be read by a reader when inserted into the reader. Such readers are associated with personal computers and dedicated computer systems. A standard memory card of this type is called an ISO (International Standards Organization) ID-1 card, having the standard dimensions 85.6 (±0.12) mm in length, 53.98 (±0.06) mm in width, and 0.76 (±0.08) mm in thickness (ISO 7810 and 7813). Efforts are continuously being made to increase the memory storage capacity of memory cards in general, and the ISO size card in particular.

SUMMARY OF THE INVENTION

An object of the present invention is to provide a memory card that may be used as an ISO regulation size card having a very high memory storage capacity. The memory card of the present invention, however, may also be used in other applications and in other sizes. Another object of the invention is to provide a reader for use with the novel memory card.

According to the present invention, there is provided a memory card for insertion into a reader having a reading head and a rotary drive, comprising: a base sheet formed with a circular opening therethrough configured to accommodate a circular memory disc, and a lateral opening therethrough configured to accommodate a movable window assembly; a circular memory disc rotatably mounted within the circular opening; a pair of cover sheets overlying opposite faces of the base sheet and rotatably mounting the circular memory disc between them, at least one of the cover sheets being formed with a window opening aligned with a Read section of the respective face of the circular memory disc; and a movable window assembly within the lateral opening of the base sheet and covered by the cover sheets; the movable window assembly including a plastic film carried by a carrier member and movable either to a protective position wherein the plastic film covers the window opening, or to an exposing position laterally of the window opening wherein the plastic film exposes the Read section of the circular memory disc to the reading head of the reader.

The memory disc could consist of flexible plastic film coated with a sensitive magnetic surface. Except for size, the magnetic discs could be identical to the magnetic discs used for memory storage in the 3.5" and 5.25" cartridges of personal computers. Other memory discs could have magneto-optical surfaces or an ablative surface storage medium. The description below stresses applications where the memory disc is a magnetic disc and its associated magnetic head reader. The extension to other storage methods and reading heads is straightforward.

According to more specific features of the present invention, the lateral opening in the base sheet leads to a lateral edge of the base sheet, and the movable window assembly further includes a spring normally urging the carrier member to the protective position, but permitting the carrier member to be moved to the exposing position by an actuator in the reader received via the lateral edge of the base sheet when the memory card is inserted into the reader.

As will be described below, such a memory card can be constructed as an ISO size card having a very high memory storage capacity. One application of such a memory card is for storing the complete health history of a person so that, e.g., in an emergency, the complete health history of the person is immediately available to the attending health personnel.

The invention also provides the combination of a novel memory card with a reader, and also a reader having a slot for receiving the memory card, an actuator for moving the window assembly from its protective position to its exposing position when the memory card is received with the slot, a Read head aligned with a Read section of the circular memory disc exposed by the movable window when the memory card is inserted into the reader, and a rotary drive for rotating the circular memory disc when the memory card is received within the slot.

Further features and advantages of the invention will be apparent from the description below.

BRIEF DESCRIPTION OF DRAWINGS

The invention is herein described, by way of example only, with reference to the accompanying drawings, wherein:

FIG. 1 is an exploded, three-dimensional view, illustrating the basic structure of one form of memory card constructed in accordance with the present invention;

FIG. 2 is an exploded view illustrating the elements of a movable window assembly included in the memory card of FIG. 1;

and FIG. 6 illustrates the memory card and the cooperative actuator element of the reader.

DETAILED DESCRIPTION OF PREFERRED EMBODIMENTS

Figure 3:
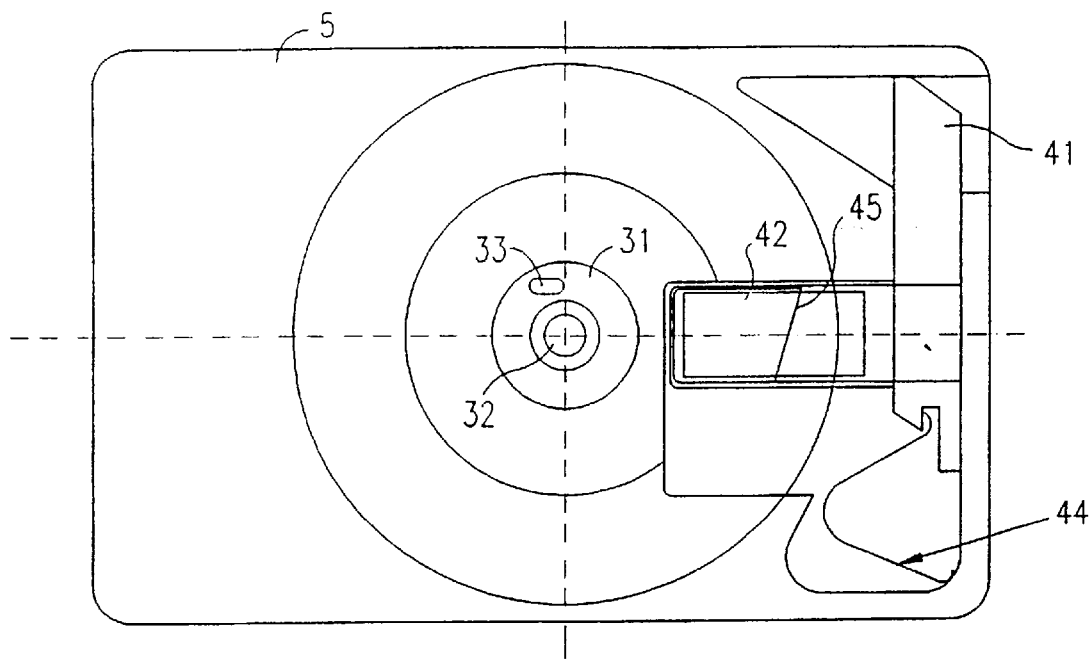
FIG. 3 is a top plan view illustrating the memory card of FIG. 1 in its assembled normal condition.

The memory card illustrated in FIGS. 1–4 is of the above-mentioned ISO (International Standards Organization) size. Briefly, it includes a base sheet 2, a circular memory disc 3 rotatably mounted within the base sheet, a movable protective window assembly 4 (FIG. 2), a pair of cover sheets 5, 6 overlying the opposite faces of the base sheet 2 and the circular memory disc 3 therein, and a pair of liner discs 7, 8 interposed between the cover sheets 5, 6, and the respective face of the circular memory disc 3.

The base sheet 2 is preferably made of stiff plastic material. It is formed with a central circular opening 21 through the sheet and configured to accommodate the circular memory disc 3. Base sheet 2 is further formed with a lateral opening 22, constituted of a section 23 communicating with circular opening 21, another section 24 leading to the edge of the base sheet, and a juncture section 25 between sections 23 and 24.

In FIG. 1, the base sheet 2 and the cover sheets 5 and 6 are shown as separate elements which are joined in the assembly process. In a practical manufacturing process, it may be preferable to integrally form the two cover sheets 5 and 6 with the base sheet 2.

The circular memory disc 3 may have the structure of a conventional magnetic diskette or floppy disc, but of smaller diameter, capable of recording and reading information from either side. It includes a cental hub 31 of ferro-magnetic material for rotatably mounting the disc between the two cover sheets 5, 6. Hub 31 is formed with a central opening 32 for rotatably mounting the circular memory disc 3, and with a small eccentric opening 33 engageable with a rotary drive element of the reader (as will be described below) for rotating the memory disc 3. Disc 3 is also formed with a central opening 34 and an eccentric opening 35 both in alignment with openings 32 and 33, respectively, of its hub 31.

The slidable window assembly 4 illustrated in FIG. 2 is received within opening 23 of the base sheet 2. Window assembly 4 includes a carrier member 41 carrying a pair of stiff plastic films 42, 43, and a spring 44 which normally urges the carrier member to a protective position (FIG. 3) wherein the plastic films 42, 43 overlie and protect a Read section of the memory disc 3, but permits the carrier member to be moved to an exposed position (FIG. 4) wherein the plastic films are located laterally of the Read section of the memory disc and thereby permit reading information from both sides of the memory disc.

Carrier member 41 is of rectangular configuration and is formed of a stiff or rigid material, such as rigid plastic or metal. In includes a slanted edge 45 at one end, cooperable with the reader in which the memory card is to be used as will be described more particularly below, and a recess 46 at the opposite end for receiving the spring 44.

Figure 5:
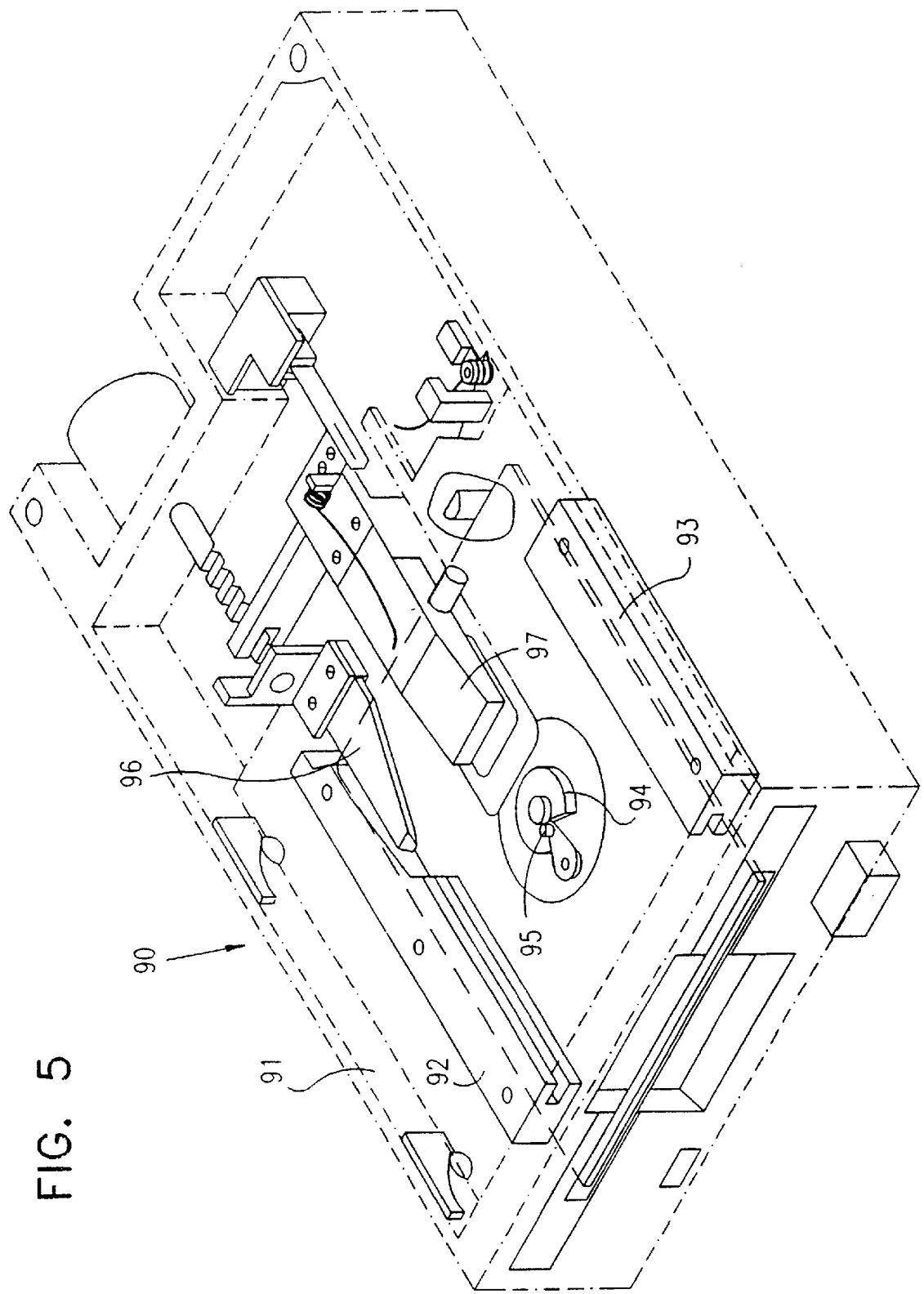
FIG. 5 illustrates one form of reader to be used with the memory card of FIGS. 1–4 for reading the information stored on such card.

The two plastic films 42, 43 are both of rectangular configuration and are each mounted by glue to the opposite sides of an intermediate section 47 of carrier member 41 to extend substantially perpendicularly to the carrier member. These plastic films may be, for example, of ployethylene terephthalate (e.g., Mylar) with a fluoronated polymer (e.g, Teflon) coating to enable smooth rotation of the magnetic disk between the films. Alternatively, these films may be of polyethylene terephthalate (e.g., Mylar) coated with a polymeric binder which contains within it the same lubricant present in the surface binder of the magnetic disk 3. Standard magnetic disks ("Floppy disks") have a surface polymeric binder which contains a fatty acid ester lubricant such as tridecyl stearate, or butyl stearate. The purpose of these lubricants is to reduce friction as the magnetic disk rotates past the non-woven liner disks 7, 8 and the magnetic reading elements of the reader (FIG. 5). If the plastic films 42, 43 possess a surface coating with the identical lubricant as the magnetic disk 3, the magnetic disc will rotate more smoothly under the films 42, 43, and the surface integrity of the magnetic disk 3 will be better maintained.

The two outer cover sheets 5, 6, are also preferably made of a stiff plastic material. Each includes a central opening 51, 61 for rotatably mounting the circular memory disc 3, and a rectangular window 52, 62, laterally of the mounting opening 51, 61, so as to be alienable with a Read section of the circular memory disc 3. Central opening 61 of the lower cover sheet 6 is of larger diameter than central opening 51 in cover sheet 5, in order to expose eccentric opening 33 of the memory disc hub 31, and to thereby enable a rotary drive element of the reader to be received within eccentric openings 33 in hub 31 and 35 in memory disc 3, as will be described more particularly below with respect to FIG. 5.

The two liner discs 7, 8, space the two cover sheets 5, 6, from the respective faces of the circular memory disc 3. These liner discs, which may be made of paper but are preferably made of a non-woven fabric, are formed with a central opening 71, 81, for accommodating hub 31 of the memory disc 3, and with rectangular slots 72, 82, aligned with the rectangular window openings 52, 62 in the cover sheets 5, 6, to expose the Read section of the memory disc 3 to the Read head of the reader, as will be described more particularly below with respect to FIG. 5.

FIG. 3 illustrates the foregoing parts assembled together, wherein the circular memory disc 3 is received within the circular opening 21 of the base sheet 2, and the window assembly 4 (FIG. 2) is received within the lateral opening 22 in the base sheet. In this normal or initial position, the two plastic films 42, 43 of the window assembly project via section 23 of lateral opening 22 to overlie the Read section of the circular memory disc 3 defined by windows 52, 62 in the cover sheets 5, 6, and slots 72, 82 in the liner discs 7, 8. It will also be seen in FIG. 3 that spring 44 of the movable window assembly 4, received within recess 46 at the end of carrier member 41, normally biasses the carrier member to its protective condition, wherein the plastic films 42, 43 overlie the Read section of the memory disc 3, and thereby prevent direct contact with its magnetic surface coating.

When the memory card is inserted into the reader (e.g., that illustrated in FIG. 5), an actuator element of the reader passes through section 24 of the lateral opening 22 in base sheet 2, to engage slanted edge 45 of carrier member 41 of the window assembly, to move the window assembly to its exposed position wherein the two plastic films 42, 43 are moved laterally of the Read section of the memory disc 3, to permit reading information from that memory disc.

One form of reader with which the memory card illustrated in FIGS. 1–4 may be used is illustrated in FIG. 5. The reader, generally designated 90, includes a housing 91 having a pair of guides 92, 93 for receiving the memory card of FIGS. 1–4. Housing 91 further includes a circular magnet 94 centrally between the two guides 92, 93 engageable with magnetic hub 31 of the memory card for properly positioning the memory card between the two guides. Housing 91 further includes a rotary drive element 95 receivable within eccentric opening 33 in hub 31, and eccentric opening 35 in the memory disc 3, for rotating the memory disc.

Figure 4:
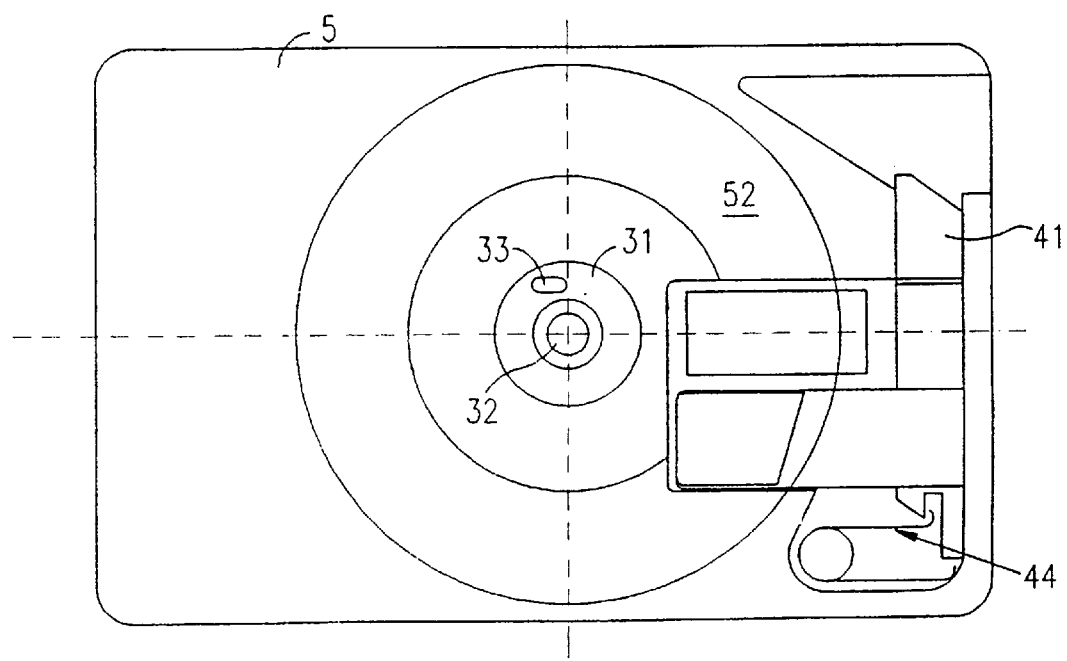
FIG. 4 is a view similar to that of FIG. 4 but illustrating the memory card in its actuated condition for reading information therefrom.

The reader illustrated in FIG. 5 further includes an actuator 96 which is received within section 24 of lateral opening 22 in the base sheet 2, when the memory card is inserted into the reader. Actuator 96 is engageable with slanted edge 45 of carrier member 41, for moving the carrier member, and the two plastic films 42, 43, carried thereby, to the exposed position of the carrier member, as illustrated in FIG. 4. The reader 90 further includes a Read head 97 which is positioned on opposite sides of the Read section in the memory disc 3, as defined by windows 52, 62 in the cover sheets 5, 6, and slots 72, 82 in the spacer discs 7, 8, for reading information from the memory disc when the window assembly is in its exposed position.

Reader 5 is otherwise constructed and operated in the same manner as conventional (3.5" flexible disk) cartridges, and therefore further details of its construction and operation are not set forth herein.

The memory card is normally in the condition illustrated in FIG. 3, with the window assembly 4 in its protective position, with the two plastic films 42, 43 overlying the Read section of the memory disc 3, thereby protecting the magnetic coatings on the disc from direct human contact. The remainder of the disc is protected from direct human contact by the cover sheets 5, 6, as well as the intermediate spacer discs 7, 8.

When information is to be read from the memory card by the use of the reader 90 in FIG. 5, the memory card is inserted between the two guides 92, 93 of the reader. Towards the end movement of the memory card into the reader, actuator element 96 of the reader engages slanted edge 45 of carrier member 41 in the movable window assembly 4, to move the window assembly laterally against the force of spring 44, to the position shown in FIG. 4. In this position, the two plastic films 42, 43 expose the Read section of the memory disc 3, thereby permitting the Read head 97, aligned with the Read section of the memory disc, to read information therefrom. During this reading of information, rotary drive element 95 of the reader 90 is received within eccentric opening 33 of hub 31, and eccentric opening 35 of the memory disc 3, such that rotation of drive element 95 will rotate the memory disc.

When the memory card is removed from the reader 90, spring 44 of the window assembly 4 moves that assembly, particularly its carrier member 41, back to the normal protective position (FIG. 3) of the window assembly with the plastic films 42, 43 overlying and thereby protecting the Read section of the memory disc.

While the invention has been described with respect to one preferred embodiment, it will be appreciated that this is set forth merely for purposes of example, and that many other variations, modifications and applications of the invention may be made.

We claim:

1. An ISO ID-1 size memory card comprising:

first and second outer card surfaces each having a rectangular, substantially non-square, configuration, at least one of said first and second outer card surfaces having a window;

a circular memory disc rotatable mounted between said first and second outer card surfaces; and a shutter assembly disposed between said first and second outer card surfaces for selectably exposing a portion of said circular memory disc to said window;

wherein said first and second outer card surfaces define respective first and second longitudinal axes which extend along the length of said first and second outer card surfaces and first and second transverse axes which extend along the width of said first and second outer card surfaces, perpendicular to said first and second longitudinal axes, and wherein said shutter assembly is slidable intermediate said first and second outer card surfaces along a shutter axis which is parallel to said first and second transverse axes, wherein said shutter assembly comprises a carrier member which lies generally in an intermediate plane in which also lies said circular memory disc and at least one shutter element joined to said carrier member, which shutter element lies at least partially between said circular memory disc and one of said first and second outer card surfaces.

2. An ISO ID-1 size memory card according to claim 1, wherein said at least one shutter element comprises a lubricant coating, wherein said lubricant coating is a fluorinated polymer.

3. An ISO ID-1 size memory card according to claim 1, wherein said at least one shutter element comprises a lubricant coating, wherein said lubricant coating is a fatty acid ester lubricant.

4. An ISO ID-1 size memory card according to claim 3, wherein said fatty acid ester lubricant is selected from a group of tridecyl stearate and butyl stearate.

5. An ISO ID-1 size memory card according to claim 1, wherein said carrier member has an inclined edge surface which is adapted to engage a driving element associated with a reader, whereby relative movement between said driving element and said memory card parallel to said first and second longitudinal axes produces transverse movement of said carrier member along said shutter axis.

* * * * *